US009156959B2

(12) United States Patent
Kato et al.

(10) Patent No.: US 9,156,959 B2
(45) Date of Patent: Oct. 13, 2015

(54) POLYESTER ELASTOMER FOAM AND FOAM MATERIAL

(75) Inventors: Kazumichi Kato, Ibaraki (JP); Makoto Saitou, Ibaraki (JP); Kiyoaki Kodama, Ibaraki (JP); Itsuhiro Hatanaka, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 70 days.

(21) Appl. No.: 13/541,303

(22) Filed: Jul. 3, 2012

(65) Prior Publication Data

US 2013/0011657 A1    Jan. 10, 2013

(30) Foreign Application Priority Data

Jul. 5, 2011    (JP) ................................ 2011-148845
May 9, 2012    (JP) ................................ 2012-107289

(51) Int. Cl.
| | | |
|---|---|---|
| *C08J 9/12* | (2006.01) | |
| *C08J 9/00* | (2006.01) | |
| *C09J 7/02* | (2006.01) | |
| *B29C 44/50* | (2006.01) | |
| C08L 33/06 | (2006.01) | |
| B29K 21/00 | (2006.01) | |
| B29K 67/00 | (2006.01) | |

(52) U.S. Cl.
CPC ................ *C08J 9/122* (2013.01); *B29C 44/50* (2013.01); *C08J 9/0061* (2013.01); *C09J 7/0289* (2013.01); *B29K 2021/003* (2013.01); *B29K 2067/00* (2013.01); *C08J 2203/08* (2013.01); *C08J 2367/02* (2013.01); *C08J 2423/08* (2013.01); *C08J 2423/26* (2013.01); *C08J 2433/08* (2013.01); *C08J 2451/06* (2013.01); *C08L 33/068* (2013.01); *C09J 2201/606* (2013.01); *C09J 2203/326* (2013.01); *C09J 2433/00* (2013.01); *C09J 2463/00* (2013.01); *C09J 2467/006* (2013.01); *Y10T 428/249983* (2015.04)

(58) Field of Classification Search
CPC .......... B32B 5/18; B32B 37/12; C09J 7/0289; C09J 2463/00; C09J 2467/006; C09J 2201/006; C09J 2203/326; C08J 9/0061; C08J 9/122; C08J 2203/08; C08J 2367/03; C08J 2423/08; C08J 2423/26; C08J 2433/08; C08J 2433/14
USPC .......................... 428/317.3, 343; 521/138, 97
See application file for complete search history.

(56) References Cited

U.S. PATENT DOCUMENTS

| | | | | |
|---|---|---|---|---|
| 3,173,826 | A * | 3/1965 | Campbell et al. ............. | 428/126 |
| 2004/0162358 | A1 | 8/2004 | Yamamoto et al. | |
| 2005/0031858 | A1 * | 2/2005 | Tachibana ..................... | 428/343 |
| 2007/0149630 | A1 | 6/2007 | Yamamoto et al. | |
| 2009/0014692 | A1 * | 1/2009 | Borade et al. ................. | 252/500 |
| 2013/0174346 | A1 * | 7/2013 | Klancnik ......................... | 5/698 |

FOREIGN PATENT DOCUMENTS

| | | |
|---|---|---|
| EP | 1 314 749 A2 | 5/2003 |
| EP | 1 449 868 A1 | 8/2004 |
| JP | 2004-250529 A | 9/2004 |
| JP | 2008-045120 A | 2/2008 |
| JP | 2012-140532 A | 7/2012 |

OTHER PUBLICATIONS

European Search Report issued in Application No. 12175030.1 dated Nov. 27, 2012.
Thomson Scientific, London, GB; AN 2004-342151 XP002685381 for JP 2003-012905, Jan. 15, 2003.
Notification dated Jul. 7, 2015 from the Japanese Patent Office in counterpart application No. 2012-107289 regarding Submission Information Statement.
First Office Action dated May 29, 2015 from the State Intellectual Property Office of People's Republic of China in counterpart Application No. 201210232762.5.

* cited by examiner

*Primary Examiner* — Hai Vo
(74) *Attorney, Agent, or Firm* — Sughrue Mion, PLLC

(57) ABSTRACT

There is provided a polyester elastomer which is excellent in compression set characteristics and has a micro cell structure. The polyester elastomer foam is formed by allowing a polyester elastomer composition containing a polyester elastomer having a melting point of 180 to 240° C. and an epoxy-modified polymer to expand. The epoxy-modified polymer is an epoxy-modified polymer having a weight average molecular weight of 5,000 to 100,000 and an epoxy equivalent of 100 to 3000 g/eq.

10 Claims, 1 Drawing Sheet

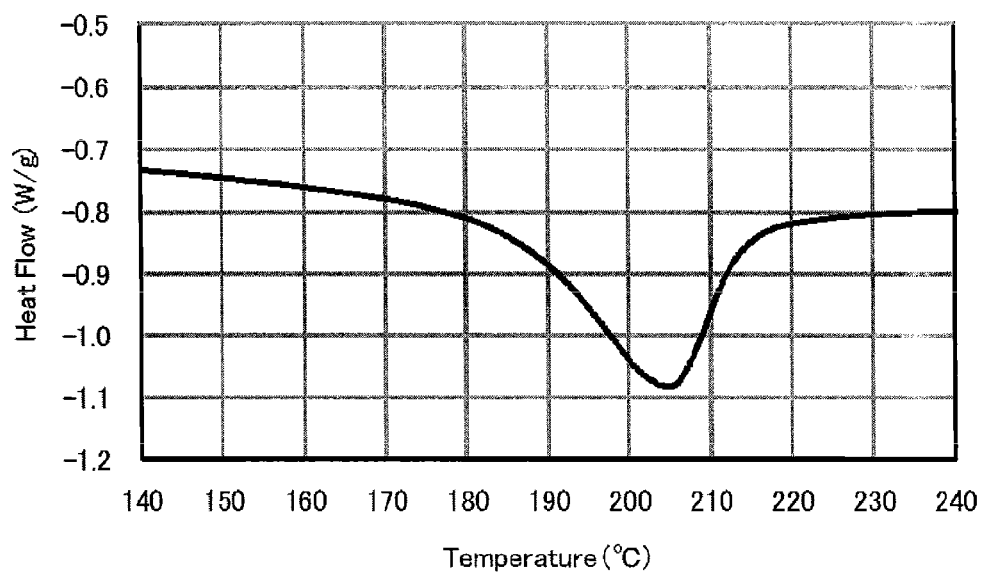

POLYESTER ELASTOMER FOAM AND FOAM MATERIAL

CROSS REFERENCE TO RELATED APPLICATIONS

This application claims priority based on Japanese Patent Application Nos. 2011-148845 filed Jul. 5, 2011 and 2012-107289 filed May 9, 2012, the contents of all of which are incorporated herein by reference in their entirety.

TECHNICAL FIELD

The present invention relates to a polyester elastomer foam and a foam material. More specifically, it relates to a polyester elastomer foam and a foam material that are used for electric or electronic appliances (such as cellular phones, personal digital assistants, digital cameras, video cameras, personal computers, household electrical appliances).

BACKGROUND ART

Elastomer foams have excellent cushioning properties and are advantageously used for sealing materials, cushioning materials, pat materials, and the like. For example, polyester elastomer foams are used as a dustproofing material, a cushioning material, or the like for liquid crystal displays, plasma displays, organic EL displays, and the like of electric or electronic appliances such as cellular phones and digital cameras.

Under such a situation, an uncrosslinked type or crosslinked type polyolefin elastomer foam has been known as an elastomer foam (refer to Patent Literature 1). However, since polyolefin elastomers have a large permanent set, it may be difficult to maintain the thickness and shape required as a sealing material at the time of punching (particularly, at the time of narrow width processing), resulting in the problem of reducing processability and product characteristics. Further, the problem of the permanent set becomes more remarkable under high temperature conditions. Solution of the problem of the permanent set is a challenge to conventional polyolefin elastomer foams. In addition, there is a demand for providing a foam having better heat resistance.

For example, a thermoplastic polyester resin foam suitable for reduction in size, weight, and thickness for electric or electronic appliances has been known (refer to Patent Literature 2). This thermoplastic polyester resin foam has a small compression residual strain and is excellent in processability. However, in the electric or electronic appliance field, there is a demand for providing a thermoplastic polyester resin foam which has a micro cell structure and is further excellent in compression set characteristics, particularly excellent in compression set characteristics at high temperatures. Furthermore, when this thermoplastic polyester resin foam is blackened by adding a colorant, the resulting foam may have deteriorated permanent set characteristics or may not be able to form a micro cell structure.

CITATION LIST

Patent Literature

Patent Literature 1: Japanese Unexamined Patent Application Publication (JP-A) No. 2004-250529
Patent Literature 2: Japanese Unexamined Patent Application Publication (JP-A) No. 2008-45120

SUMMARY OF INVENTION

Technical Problem

In particular, when the polyester foam is blackened, the foam may result in reduction of permanent set characteristics and may contain a coarse cell structure, leading to the problem of reduction in product characteristics such as dustproofness, water resistance, soundproofing properties, processability, and anchoring properties with a double-sided tape (double-coated tape).

Accordingly, an object of the present invention is to provide a polyester elastomer which is excellent in compression set characteristics and has a micro cell structure.

Another object of the present invention is to provide a foam material for electric or electronic appliances in which a polyester elastomer foam is used.

Solution to Problem

Thus, after intensive investigations, the present inventors have found that when a polyester elastomer composition containing a polyester elastomer having a predetermined melting point and an epoxy-modified polymer is used as a polyester elastomer composition to be used for forming a polyester elastomer foam, the composition is excellent in melt tension and spreadability (drawdown properties), can be highly expanded, and can provide a polyester elastomer foam having excellent compression set characteristics and a micro cell structure. The present invention has been made based on these findings.

Specifically, the present invention provides a polyester elastomer foam which is formed by allowing a polyester elastomer composition containing a polyester elastomer having a melting point of 180 to 240° C. and an epoxy-modified polymer to expand.

The epoxy-modified polymer is preferably an epoxy-modified polymer having a weight average molecular weight of 5,000 to 100,000 and an epoxy equivalent of 100 to 3000 g/eq.

The epoxy-modified polymer is preferably at least one polymer selected from an epoxy-modified acrylic polymer and an epoxy-modified polyethylene.

The polyester elastomer foam preferably has a cell structure having an average cell diameter of 10 to 200 μm.

The polyester elastomer foam preferably has an apparent density of 0.01 to 0.20 g/cm$^3$, a repulsive force at 50% compression of 0.1 to 4.0 N/cm$^2$, and a compression set at 80° C. (after being maintained in a 50% compression state for 24 hours) of 60% or less.

The polyester elastomer foam is preferably formed through the steps of impregnating the polyester elastomer composition with a high-pressure gas and subjecting the impregnated polyester elastomer composition to decompression to allow the impregnated polyester elastomer composition to expand. The gas is preferably an inert gas. Further, the gas is preferably carbon dioxide gas. Furthermore, the gas is preferably in a supercritical state.

In addition, the present invention provides a foam material comprising the polyester elastomer foam.

The foam material preferably has a pressure-sensitive adhesive layer on the polyester elastomer foam. The pressure-sensitive adhesive layer is preferably an acrylic pressure-sensitive adhesive layer.

Further, the present invention provides a process for producing a polyester elastomer foam, the process comprising allowing a polyester elastomer composition containing a polyester elastomer having a melting point of 180° C. to 240° C. and an epoxy-modified polymer to expand to thereby obtain the polyester elastomer foam.

Advantageous Effects of Invention

Since the polyester elastomer foam according to the present invention has the above constitutional features, it has a micro cell structure and is excellent in compression set characteristics.

BRIEF DESCRIPTION OF DRAWING

FIG. 1 is a graph showing a DSC (differential scanning calorimetry) curve of a polyester elastomer (trade name "Hytrel 5577" supplied by Du Pont-Toray Co., Ltd.) used in examples. The axis of ordinates shows a heat flow (W/g), and the axis of abscissas shows temperature (° C.).

DESCRIPTION OF EMBODIMENTS (Polyester Elastomer Foam)

The polyester elastomer foam of the present invention is formed by allowing a polyester elastomer composition to expand. This polyester elastomer composition contains at least a polyester elastomer having a melting point of 180 to 240° C. and an epoxy-modified polymer. Note that in the present application, a polyester elastomer having a melting point of 180 to 240° C. may be referred to as the "polyester elastomer of the present invention".

The polyester elastomer of the present invention is an elastomer containing a polyester polymer. Further, the polyester elastomer of the present invention is an essential component which constitutes the polyester elastomer foam of the present invention. The content of the polyester elastomer of the present invention in the polyester elastomer composition is preferably 80% by weight or more, more preferably 85% by weight or more, relative to the total amount (100% by weight) of the polyester elastomer composition, but is not particularly limited thereto. Note that the polyester elastomer of the present invention may contain only one polymer or may contain two or more polymers.

The polyester polymer contained in the polyester elastomer of the present invention is not particularly limited as long as it is a polymer having a binding site derived from polymerization between a dicarboxylic acid and a diol. Examples of the polyester polymer include a polyester resin having an ester binding site derived from a reaction (polycondensation) of a polyol component with a polycarboxylic acid component and a polyester elastomer which is a block copolymer of a hard segment and a soft segment. In the present application, the "polyester resin having an ester binding site derived from a reaction (polycondensation) of a polyol component with a polycarboxylic acid component" may be referred to as a "polyester resin." Further, the "polyester elastomer which is a block copolymer of a hard segment and a soft segment" may be referred to as an "HS block-copolymer polyester elastomer". Note that the polyester polymer may be used alone or in combination.

The dicarboxylic acid include aromatic dicarboxylic acids such as terephthalic acid, isophthalic acid, phthalic acid, naphthalene carboxylic acid (such as 2,6-naphthalene dicarboxylic acid, 1,4-naphthalene dicarboxylic acid), diphenyl ether dicarboxylic acid, 4,4-biphenyl dicarboxylic acid; and aliphatic dicarboxylic acids such as malonic acid, succinic acid, glutaric acid, and adipic acid. Note that the dicarboxylic acid may be used alone or in combination.

Further, examples of the diol component include aliphatic diols such as ethylene glycol, propylene glycol, trimethylene glycol, 1,4-butanediol (tetramethylene glycol), 2-methyl-1,3-propanediol, 1,5-pentanediol, 2,2-dimethyl-1,3-propanediol (neopentyl glycol), 1,6-hexanediol, 3-methyl-1,5-pentanediol, 2-methyl-2,4-pentanediol, 1,7-heptane diol, 2,2-diethyl-1,3-propanediol, 2-methyl-2-propyl-1,3-propanediol, 2-methyl-1,6-hexanediol, 1,8-octanediol, 2-butyl-2-ethyl-1,3-propanediol, 1,3,5-trimethyl-1,3-pentanediol, 1,9-nonanediol, 2,4-diethyl-1,5-pentanediol, 2-methyl-1,8-octanediol, 1,10-decanediol, 2-methyl-1,9-nonanediol, 1,18-octadecanediol, and dimer diol; alicyclic dials such as 1,4-cyclohexanediol, 1,3-cyclohexanediol, 1,2-cyclohexanediol, 1,4-cyclohexanedimethanol, 1,3-cyclohexanedimethanol, and 1,2-cyclohexanedimethanol; aromatic dials such as bisphenol A, an ethylene oxide adduct of bisphenol A, bisphenol S, an ethylene oxide adduct of bisphenol S, xylylene diol, and naphthalenediol; ether glycols such as diethylene glycol, triethylene glycol, tetraethylene glycol, polyethylene glycol, and dipropylene glycol. Further, the diol component may be a dial component in a polymer form such as a polyether diol and a polyester diol. Examples of the polyetherdiols include polyethylene glycol, polypropylene glycol, and polytetramethylene glycol obtained by ring opening polymerization of ethylene oxide, propylene oxide, and tetrahydrofuran, respectively, and polyetherdiols such as copolyethers obtained by copolymerization of these monomers. Note that the dial component may be used alone or in combination.

The polyester polymer may be a polyester resin obtained by the polycondensation of the aromatic dicarboxylic acid (bivalnet aromatic carboxylic acid) with a diol component. Note that in the present application, the "polyester resin obtained by the polycondensation of an aromatic dicarboxylic acid with a diol component" may be referred to as an "aromatic polyester resin".

Examples of the aromatic polyester resin include polyalkylene terephthalate resins such as polyethylene terephthalate, polytrimethylene terephthalate, polybutylene terephthalate, polyethylene naphthalate, polybutylene naphthalate, and polycyclohexane terephthalate. Further, the aromatic polyester resin may be a copolymer obtained by copolymerizing two or more of the polyalkylene terephthalate resins. Note that when the polyalkylene terephthalate resin is a copolymer, it may be a copolymer in the form of a random copolymer, a block copolymer, or a graft copolymer.

Further, examples of the HS block copolymer polyester elastomer include (i) a polyester-polyester type copolymer containing, as a hard segment, a polyester formed by polycondensation of the aromatic dicarboxylic acid with a diol component having 2 to 4 carbon atoms between the hydroxyl groups in the main chain among the diol components and containing, as a soft segment, a polyester formed by polycondensation of the aromatic dicarboxylic acid with a diol component having 5 or more carbon atoms between the hydroxyl groups in the main chain among the dial components; (ii) a polyester-polyether type copolymer containing the same polyester as in the above (i) as a hard segment and containing a polyether such as the above polyetherdiols as a soft segment; and (iii) a polyester-polyester type copolymer containing the same polyester as in the above (i) and (ii) as a hard segment and containing an aliphatic polyester as a soft segment.

Examples of the polyester used as the hard segment include the polyalkylene terephthalate resins (such as polyethylene terephthalate, polybutylene terephthalate).

Examples of the aliphatic polyester include polycaprolactone; a polyester of the aliphatic dicarboxylic acid and the diol component; and a polyester formed by condensation of hydroxycarboxylic acid (such as lactic acid, glycolic acid, glyceric acid).

Further, when the HS block copolymer polyester elastomer is contained in the polyester elastomer of the present invention, a rubber component and/or a thermoplastic elastomer component to be described below may be contained together. Furthermore, when the aromatic polyester resin is contained in the polyester elastomer of the present invention, a rubber component and/or a thermoplastic elastomer component to be described below may be contained together. That is, the polyester elastomer of the present invention may be constituted by the aromatic polyester resin and a rubber component and/or a thermoplastic elastomer component to be described below. Furthermore, when the HS block copolymer polyester elastomer is contained in the polyester elastomer of the present invention, the aromatic polyester resin may be contained together.

Examples of such a rubber component and/or a thermoplastic elastomer component include, but are not particularly limited to, natural or synthetic rubber such as natural rubber, polyisobutylene, polyisoprene, chloroprene rubber, butyl rubber, and nitrile butyl rubber; olefinic elastomers such as ethylene-propylene copolymers, ethylene-propylene-diene copolymers, ethylene-vinylacetate copolymers, polybutene, and chlorinated polyethylene; styrenic elastomers such as styrene-butadiene-styrene copolymers, styrene-isoprene-styrene copolymers, and hydrogenated polymers derived from them; polyester elastomers; polyamide elastomers; and polyurethane elastomers. Note that the above rubber component and/or thermoplastic elastomer component may be used alone or in combination. The above rubber component and/or thermoplastic elastomer component has a glass transition temperature of equal to or lower than room temperature (for example, 20° C. or lower), and therefore, when the resulting polyester elastomer foam is formed into a dustproofing material or a sealing material, it is significantly excellent in flexibility and shape conformability.

When the rubber component and/or thermoplastic elastomer component is contained in the polyester elastomer of the present invention together with the HS block copolymer polyester elastomer, the rubber component and/or thermoplastic elastomer component may be suitably contained if needed because the ES block copolymer polyester elastomer itself has elasticity. Further, when the aromatic polyester resin and the rubber component and/or thermoplastic elastomer component are contained in the polyester elastomer of the present invention, the mixing ratio (weight ratio) is, for example, (aromatic polyester resin)/(rubber component and/or thermoplastic elastomer component)=5/95 to 95/5 (preferably 10/90 to 90/10, more preferably 20/80 to 80/20). If the proportion of the rubber component and/or thermoplastic elastomer component is less than 1% by weight, the cushioning properties of the resulting polyester elastomer foam may tend to be reduced. On the other hand, if the proportion of the rubber component and/or thermoplastic elastomer component exceeds 99% by weight, outgassing may tend to occur during the expansion of the polyester elastomer composition, resulting in difficulty in obtaining a highly expanded polyester elastomer foam.

The polyester elastomer of the present invention has a melting point of 180 to 240° C., preferably 190 to 220° C. If the melting point is less than 180° C., a polyester elastomer composition having a sufficient melt tension may not be obtained, and the composition may not be highly expanded. On the other hand, if the melting point exceeds 240° C., a polyester elastomer composition having a good spreadability (drawdown properties) may not be obtained, and thereby a polyester elastomer having excellent compression set characteristics and a micro cell structure may not be obtained.

Note that the melting point is determined as follows: differential scanning calorimetry is performed under the conditions where a sample is melted by heating at a heating rate of 10° C./min (first heating); next, the temperature of the sample is reduced to −50° C. by cooling at a temperature decreasing rate of 10° C./min (first cooling); and the temperature of the sample is increased from −50° C. by heating at a heating rate of 10° C./min (second heating), and the temperature at the top of the melting peak (melting peak temperature) determined during the above second heating is defined as the melting point. Note that the differential scanning calorimetry is based on JIS K 7122 (Testing Methods for Heat of Transitions of Plastics).

An epoxy-modified polymer is contained as an essential component in the polyester elastomer composition for forming the polyester elastomer foam of the present invention. Note that the epoxy-modified polymer may be used alone or in combination.

The epoxy-modified polymer is a polymer having an epoxy group at a terminal of the main chain and/or in a side chain. It is also a polymer having two or more epoxy groups in one molecule. Particularly, the epoxy-modified polymer is preferably a polymer having an epoxy group by having a glycidyl (meth)acrylate unit at a terminal of the main chain and/or in a side chain.

The epoxy-modified polymer is preferably, but is not particularly limited to, at least one polymer selected from among an epoxy-modified acrylic polymer which is a polymer having an epoxy group at a terminal of the main chain and/or in a side chain of an acrylic polymer and an epoxy-modified polyethylene which is a polymer having an epoxy group at a terminal of the main chain and/or in a side chain of polyethylene in that these polymers hardly form a three-dimensional network as compared with a compound having a low-molecular-weight epoxy group and can easily obtain a polyester elastomer composition excellent in melt tension and the degree of strain hardening.

The weight average molecular weight of the epoxy-modified polymer is preferably 5,000 to 100,000, more preferably 8,000 to 80,000, further preferably 10,000 to 70,000, most preferably 20,000 to 60,000, but is not particularly limited thereto. Note that if the molecular weight is less than 5,000, the reactivity of the epoxy-modified polymer may increase, and the polyester elastomer composition may not be highly expanded.

The epoxy equivalent of the epoxy-modified polymer is preferably 100 to 3000 g/eq, more preferably 200 to 2500 g/eq, further preferably 300 to 2000 g/eq, most preferably 800 to 1600 g/eq, but is not particularly limited thereto. If the epoxy equivalent exceeds 3000 g/eq, the melt tension and the degree of strain hardening of the polyester elastomer composition may not be sufficiently improved. On the other hand, if the epoxy equivalent is less than 100 g/eq, the reactivity of the epoxy-modified polymer will be increased and the viscosity of the polyester elastomer composition will be excessively high, and thereby, the polyester elastomer composition may not be highly expanded.

The viscosity (B type viscosity, 25° C.) of the epoxy-modified polymer is preferably 2000 to 4000 mPa·s, more preferably 2500 to 3200 mPa·s, but is not particularly limited thereto. If the viscosity is less than 2000 mPa·s, failure of a cell wall may occur when the polyester elastomer composition is subjected to foam molding, preventing a foam having a highly expanded structure from being obtained. On the other hand, if the viscosity exceeds 4000 mPa·s, the fluidity of the polyester elastomer composition may be reduced.

The epoxy-modified polymer particularly preferably has a weight average molecular weight of 5,000 to 100,000 and an epoxy equivalent of 100 to 3000 g/eq.

The content of the epoxy-modified polymer in the polyester elastomer composition is preferably 0.5 to 4.0 parts by weight, more preferably 1.0 to 3.5 parts by weight, further preferably 1.5 to 3.0 parts by weight, relative to 100 parts by weight of the polyester elastomer of the present invention, but is not particularly limited thereto. If the content of the epoxy-modified polymer is less than 0.5 part by weight, the melt tension and the degree of strain hardening of the polyester elastomer composition cannot be sufficiently increased, and a highly expanded polyester elastomer foam having a micro cell structure may not be obtained. Further, the foam cannot obtain sufficient crosslink density, which may adversely affect the compression set characteristics of the foam. On the other hand, if the content of the epoxy-modified polymer exceeds 4.0 parts by weight, the viscosity of the polyester elastomer composition may be too high to obtain a highly expanded polyester elastomer foam having a micro cell structure.

The epoxy-modified polymer acts as a crosslinking agent. It also acts as a modifier (resin modifier) for improving the melt tension and the degree of strain hardening of the polyester elastomer composition.

Further, the epoxy-modified polymer can prevent polyester chains from being cut by hydrolysis (such as hydrolysis resulting from moisture absorption by raw materials), thermal decomposition, oxidative degradation, and the like and allow the cut polyester chains to recombine, thereby capable of further improving the melt tension of the polyester elastomer composition. Further, since the epoxy-modified polymer has many epoxy groups in one molecule, it can more easily form a branching structure than conventional epoxy crosslinking agents and can further improve the degree of strain hardening of the polyester elastomer composition.

The polyester elastomer composition may further contain a crystallization promoter within the range which does not prevent the effects of the invention of the instant application. Examples of the crystallization promoter include, but are not particularly limited to, an olefinic resin. Preferred ones among such olefinic resins include a resin of a type having a wide molecular weight distribution with a shoulder on the high molecular weight side, a slightly crosslinked type resin (a resin of a type crosslinked a little), and a long-chain branched type resin. Examples of the olefinic resins include low density polyethylene, medium density polyethylene, high density polyethylene, linear low density polyethylene, polypropylene, a copolymer of ethylene and propylene, a copolymer of ethylene or propylene and another alpha olefin (such as butene-1, pentene-1, hexene-1, and 4-methylpentene-1), and a copolymer of ethylene and another ethylenic unsaturated monomer (such as vinyl acetate, acrylic acid, acrylate, methacrylic acid, methacrylate, and vinyl alcohol). Note that when the olefinic resin is a copolymer, the copolymer may be in either form of a random copolymer or a block copolymer. Further, the olefinic resin may be used alone or in combination.

Excellent formability will be obtained when the crystallization promoter is contained in the polyester elastomer composition. The content of the crystallization promoter in the polyester elastomer composition is preferably 0.1 to 30 parts by weight, more preferably 0.5 to 15 parts by weight, relative to 100 parts by weight of the polyester elastomer, but is not particularly limited thereto.

The polyester elastomer composition preferably further contains powder particles. The powder particles exhibit a function as a foam nucleating agent at the time of foam molding. Therefore, a polyester elastomer foam in a good foam state is obtained by incorporating powder particles in the polyester elastomer composition.

Examples of the powder particles include talc powder, silica, alumina, zeolite, calcium carbonate, magnesium carbonate, barium sulfate, zinc oxide, titanium oxide, aluminum hydroxide, magnesium hydroxide, mica, clay such as montmorillonite, hard clay, carbon particles, glass fiber, and carbon nanotubes. Note that these powder particles may be surface-treated. Examples of the powder particles also include hard clay which is treated with a silane coupling agent such as aminosilane, mercaptosilane, and vinylsilane. Note that the powder particles may be used alone or in combination.

The average particle size (particle size) of the powder particles is preferably 0.1 to 20 μm, but is not limited thereto. If the average particle size is less than 0.1 μm, the powder may not sufficiently function as a nucleating agent, and if the particle size exceeds 20 μm, it may cause outgassing at the time of foam molding. Therefore, these average particle sizes are not preferred.

The content of the powder particles in the polyester elastomer composition is preferably 0.1 to 150 parts by weight, more preferably 0.2 to 130 parts by weight, further preferably 0.3 to 50 parts by weight, relative to 100 parts by weight of the polyester elastomer, but is not particularly limited thereto. If the content of the powder particles is less than 0.1 part by weight, it may be difficult to obtain a uniform foam. On the other hand, if the content of the powder particles exceeds 150 parts by weight, the viscosity of the polyester elastomer composition may significantly increase and outgassing may occur at the time of foam formation, thereby impairing foaming characteristics.

Since the polyester elastomer foam is constituted by a polyester elastomer, it has the characteristics of easy burning (as a matter of course, it is also a disadvantage). For this reason, particularly when the polyester elastomer foam is used for applications in which it is indispensable to impart flame retardancy such as electric appliance or electronic appliance application, a flame retardant is preferably contained in the polyester elastomer composition.

Examples of the flame retardant include, but are not particularly limited to, powder particles having flame retardancy (such as various powdery flame retardants), and preferably include inorganic flame retardants. Examples of the inorganic flame retardants may include brominated flame retardants, chlorine-based flame retardants, phosphorus flame retardants, and antimony flame retardants. However, chlorine-based flame retardants and brominated flame retardants generate a gas component which is harmful to a human body and corrosive to equipment when it burns, and phosphorus flame retardants and antimony flame retardants have problems such as harmfulness and explosibility. Therefore, non-halogen non-antimony inorganic flame retardants (inorganic flame retardants in which halogenated compounds and antimony compounds are not contained) are preferred. Examples of the non-halogen non-antimony inorganic flame retardants include hydrated metal compounds such as aluminum hydroxide, magnesium hydroxide, a magnesium oxide/nickel oxide hydrate, and a magnesium oxide/zinc oxide hydrate. Note that the hydrated metal oxides may be surface-treated. The flame retardant may be used alone or in combination.

The content of the flame retardant in the polyester elastomer composition is preferably 10 to 70% by weight, more preferably 25 to 65% by weight, relative to the total amount of the polyester elastomer composition, but is not particularly limited thereto. If the content of the flame retardant is less than 10% by weight, flame retardation effect may be small. On the contrary, if it exceeds 70% by weight, it may be difficult to obtain a highly expanded foam.

Further, the polyester elastomer composition may contain a lubricant within the range which does not prevent the effects of the invention of the instant application. Examples of the lubricant include, but are not particularly limited to, aliphatic carboxylic acids and derivatives thereof (such as aliphatic carboxylic acid anhydrides, alkali metal salts of aliphatic carboxylic acids, and alkaline earth metal salts of aliphatic carboxylic acids). Among the aliphatic carboxylic acids and derivatives thereof, especially preferred are aliphatic carboxylic acids having 3 to 30 carbon atoms such as lauryl acid and derivatives thereof, stearic acid and derivatives thereof, crotonic acid and derivatives thereof, oleic acid and derivatives thereof, maleic acid and derivatives thereof, glutaric acid and derivatives thereof, behenic acid and derivatives thereof, and montanic acid and derivatives thereof. Further, among the aliphatic carboxylic acids having 3 to 30 carbon atoms and derivatives thereof, stearic acid and derivatives thereof and montanic acid and derivatives thereof are preferred, and alkali metal salts of stearic acid and alkaline earth metal salts of stearic acid are particularly preferred, in terms of dispersibility and solubility in the polyester elastomer composition and the effect of improvement in surface appearance. Furthermore, zinc stearate and calcium stearate are more suitable among the alkali metal salts of stearic acid and the alkaline earth metal salts of stearic acid. In addition, the lubricant suitably includes an acrylic lubricant besides the aliphatic carboxylic acids and derivatives thereof. Note that the lubricant may be used alone or in combination.

The content of the lubricant in the polyester elastomer composition is preferably 0.1 to 20 parts by weight, more preferably 0.5 to 10 parts by weight, relative to 100 parts by weight of the resin (such as the polyester elastomer) in the polyester elastomer composition, but is not particularly limited thereto. If the content of the lubricant in the polyester elastomer composition is too small, the effect produced by the addition of the lubricant will be small, and conversely, if it is too large, it will be difficult to obtain a highly expanded foam.

Further, the polyester elastomer composition may optionally contain additives within the range which does not prevent the effects of the invention of the instant application. Examples of the additives include crystal nucleators, plasticizers, colorants (such as carbon black aiming at black color, pigments, and dyestuffs), ultraviolet absorbers, antioxidants, age inhibitors, fillers, reinforcements, antistatic agents, surfactants, shrink resistant agents, fluidity improving agents, vulcanizing agents, surface-treating agents, and dispersing aids. Further, the additives may be used alone or in combination.

The polyester elastomer composition is prepared, for example, by mixing the polyester elastomer of the present invention, the epoxy-modified polymer, and the additives optionally added. The way to prepare the composition, however, is not limited to this. Note that heat may be applied at the time of the preparation.

The melt tension (take-over speed: 3.0 m/min) of the polyester elastomer composition is preferably 10 to 70 cN, more preferably 13 to 60 cN, further preferably 15 to 50 cN, but is not particularly limited thereto. If the melt tension of the polyester elastomer composition is less than 10 cN, the expansion ratio will be low, closed cells will be hardly formed, and the shape of the cells formed will tend to be nonuniform, when the polyester elastomer composition is allowed to expand. On the other hand, if the melt tension of the polyester elastomer composition exceeds 70 cN, the composition may have a reduced fluidity, which may adversely affect foaming. Note that the melt tension of the polyester elastomer composition is the melt tension at the temperature during the foam molding of the polyester elastomer composition.

The degree of strain hardening (strain rate: 0.1 [1/s]) of the polyester elastomer composition is preferably 2.0 to 5.0, more preferably 2.5 to 4.5, in terms of obtaining a highly expanded foam having a uniform and dense cell structure while suppressing rupture of cells during the expansion, but is not particularly limited thereto. Further, the degree of strain hardening of the polyester elastomer composition is the degree of strain hardening at the temperature during the foam molding of the polyester elastomer composition. Note that the degree of strain hardening is an index showing the degree of the increase in the uniaxial elongational viscosity in the measurement of the uniaxial elongational viscosity, in the region (nonlinear region) where the uniaxial elongational viscosity has risen, separated from the region (linear region) where the uniaxial elongational viscosity gradually increases with the increase in strain after starting the measurement.

The polyester elastomer foam of the present invention is formed by foam molding the polyester elastomer composition. A process for foaming the polyester elastomer composition preferably includes, but is not limited to, a foaming process comprising impregnating the polyester elastomer composition with a high-pressure gas (particularly inert gas) and then subjecting the impregnated polyester elastomer composition to decompression (pressure relief). That is, the polyester elastomer foam of the present invention is preferably formed through the steps of impregnating the polyester elastomer composition with a high-pressure gas (particularly inert gas) and then subjecting the impregnated polyester elastomer composition to decompression. Note that the inert gas refers to a gas which is inert to the polyester elastomer composition and with which the polyester elastomer composition can be impregnated.

The process for foaming the polyester elastomer composition includes a physical foaming technique (foaming process using a physical technique). If foaming is performed according to the physical technique, there may occur problems about the combustibility, toxicity, and influence on the environment such as ozone layer depletion of the substance used as a blowing agent (blowing agent gas). However, the foaming technique using an inert gas is an environmentally friendly technique in that the blowing agent as described above is not used. The process for foaming the polyester elastomer composition also includes a chemical foaming technique (foaming process using a chemical technique). If foaming is performed according to the chemical technique, a residue of a blowing gas produced from the blowing agent remains in the foam. This may cause a trouble of contamination by a corrosive gas or impurities in the gas especially in electronic appliances where suppression of contamination is highly needed. However, according to the foaming technique using an inert gas, a clean foam without such impurities and the like can be obtained. In addition, the physical and chemical foaming techniques are believed to be difficult to give a micro cell structure and to be very difficult to give micro cells of 300 µm or less.

Examples of the inert gas include, but are not limited to, carbon dioxide (carbonic acid gas), nitrogen gas, helium, and air. These gases may be mixed and used. Among these, carbon dioxide is suitable in that it can be impregnated in a large amount and at a high rate into the polyester elastomer which is a material of the foam.

Further, from the viewpoint of increasing the rate of impregnation into the polyester elastomer composition, the high-pressure gas (particularly inert gas such as carbon dioxide) is preferably in a supercritical state. Such a gas in a supercritical state shows increased solubility in the polyester elastomer composition and can be incorporated therein in a higher concentration. In addition, because of its high concentration, the supercritical gas generates a larger number of cell nuclei upon an abrupt pressure drop after impregnation. These cell nuclei grow to give cells, which are present in a higher density than in a foam having the same porosity but produced with the gas in another state. Consequently, use of a supercritical gas can give micro cells. Note that the critical temperature and critical pressure of carbon dioxide are 31° C. and 7.4 MPa, respectively.

The polyester elastomer foam of the present invention is produced by impregnating the polyester elastomer composition with a high-pressure gas (particularly inert gas). The production may be performed by a batch system or continuous system. In the batch system, the polyester elastomer composition is previously molded into an unfoamed resin molded article (unfoamed molded article) in an adequate form such as a sheet form, and then the unfoamed resin molded article is impregnated with a high-pressure gas (particularly inert gas), and the unfoamed resin molded article is then released from the pressure to allow the molded article to expand. In the continuous system, the polyester elastomer composition is kneaded under a pressure together with a high-pressure gas (particularly inert gas), and the kneaded mixture is molded into a molded article and, simultaneously, is released from the pressure. Thus, molding and foaming are performed simultaneously in the continuous system.

A case where the polyester elastomer foam of the present invention is produced by a batch system will be specifically described. In the batch system, an unfoamed resin molded article is first produced when the polyester elastomer foam is produced. Examples of the process for producing the unfoamed resin molded article include, but are not particularly limited to, a process in which the polyester elastomer composition is extruded with an extruder such as a single-screw extruder or twin-screw extruder; a process in which the polyester elastomer composition is uniformly kneaded beforehand with a kneading machine equipped with one or more blades typically of a roller, cam, kneader, or Banbury type, and the resulting mixture is press-molded typically with a hot-plate press to thereby produce an unfoamed resin molded article having a predetermined thickness; and a process in which the polyester elastomer composition is molded with an injection molding machine. It is preferred to select a suitable process to give an unfoamed resin molded article having a desired shape and thickness among these processes. Note that the unfoamed resin molded article may be produced by other forming process in addition to extrusion, press molding, and injection molding. Further, with respect to the shape of the unfoamed resin molded article, various shapes are selected depending on applications, in addition to a sheet form. Examples of the shape include a sheet form, roll form, prism form, and plate form. Next, cells are formed in the polyester elastomer composition through a gas impregnation step of putting the unfoamed resin molded article (molded article of the polyester elastomer composition) in a pressure-tight vessel (high pressure vessel) and injecting (introducing) a high-pressure inert gas (such as carbon dioxide) to impregnate the unfoamed resin molded article with the high-pressure inert gas; a decompression step of releasing the pressure (typically, to atmospheric pressure) when the unfoamed resin molded article is sufficiently impregnated with the high-pressure inert gas to allow cell nuclei to be generated in the polyester elastomer composition; and optionally (where necessary) a heating step of heating the polyester elastomer composition to allow the cell nuclei to grow. Note that the cell nuclei may be allowed to grow at room temperature without providing the heating step. After the cells are allowed to grow in this way, the polyester elastomer composition is rapidly cooled with cold water as needed to fix its shape to yield the polyester elastomer foam. Note that the introduction of the high-pressure gas (particularly inert gas) may be performed continuously or discontinuously. The heating for the growth of cell nuclei can be performed according to a known or common procedure such as heating with a water bath, oil bath, hot roll, hot-air oven, far-infrared rays, near-infrared rays, or microwaves.

On the other hand, examples of the case where the polyester elastomer foam of the present invention is produced by a continuous system include the production by a kneading/impregnation step of kneading the polyester elastomer composition with an extruder such as a single-screw extruder or twin-screw extruder and, during this kneading, injecting (introducing) a high-pressure gas (particularly inert gas such as carbon dioxide) to impregnate the polyester elastomer composition with the sufficiently high-pressure gas; and a subsequent molding/decompression step of extruding the polyester elastomer composition through a die arranged at a distal end of the extruder to thereby release the pressure (typically, to atmospheric pressure) to perform molding and foaming simultaneously. Optionally (where necessary), a heating step may be further provided to enhance cell growth by heating. After the cells are allowed to grow in this way, the polyester elastomer composition is rapidly cooled with cold water as needed to fix its shape to yield the polyester elastomer foam. Note that, in the kneading/impregnation step and molding/decompression step, an injection molding machine or the like may be used in addition to an extruder.

In the gas impregnation step in the batch system or in the kneading/impregnation system in the continuous system, the amount of the high-pressure gas (particularly inert gas) to be incorporated into the polyester elastomer composition is, for example, 1.0 to 10% by weight, more preferably 1.5 to 8.0% by weight, relative to the total amount of the polyester elastomer composition, but is not particularly limited thereto. The incorporation of the gas is controlled as appropriate to obtain desired parameters such as density and expansion ratio in the polyester elastomer foam.

In the gas impregnation step in the batch system or in the kneading/impregnation system in the continuous system, the pressure at which the unfoamed resin molded article or the polyester elastomer composition is impregnated with a high-pressure gas is suitably selected in consideration of the type of gas and the operability. When an inert gas, particularly carbon dioxide, is used as the gas, the pressure is preferably 3 MPa or more (for example, 3 to 100 MPa), more preferably 4 MPa or more (for example, 4 to 100 MPa). If the pressure of the gas is lower than 3 MPa, considerable cell growth may occur during foaming, and this may tend to result in too large cell diameters and hence in disadvantages such as insufficient soundproofing/dustproofing effect. The reasons for this are as follows. When impregnation is performed at a low pressure, the amount of gas impregnated is relatively small and cell nuclei are formed at a lower rate as compared with impregnation at higher pressures. As a result, the number of cell nuclei formed is smaller. Because of this, the gas amount per cell increases rather than decreases, resulting in excessively large cell diameters. Furthermore, in a region of pressures lower than 3 MPa, only a slight change in impregnation pressure results in considerable changes in cell diameter and cell density, and this may often impede the control of cell diameter and cell density.

Further, in the gas impregnation step in the batch system or in the kneading/impregnation system in the continuous system, the temperature at which the unfoamed resin molded article or the polyester elastomer composition is impregnated with a high-pressure gas (particularly inert gas) varies depending on the type of gas used, the composition of the polyester elastomer composition used and the like and can be selected within a wide range. When impregnation operability and other conditions are taken into account, the impregnation temperature is preferably 10° C. to 350° C. For example, when an unfoamed resin molded article in a sheet form is impregnated with a high-pressure inert gas in the batch system, the impregnating temperature is preferably 170 to 220° C., more preferably 180 to 210° C. Further, when a high-pressure gas (particularly inert gas)) is injected into and kneaded with a polyester elastomer composition in the continuous system, the impregnation temperature is preferably 170 to 270° C., more preferably 180 to 210° C. Note that when carbon dioxide is used as a high-pressure gas, it is preferred to impregnate the gas at a temperature (impregnation temperature) of 32° C. or higher (particularly 40° C. or higher), in order to maintain its supercritical state.

Note that, in the decompression step, the decompression rate is preferably 5 to 300 MPa/s in order to obtain uniform micro cells, but is not particularly limited thereto. Further, the heating temperature in the heating step is preferably 40 to 250° C., more preferably 60 to 250° C., but is not particularly limited thereto.

Further, a polyester elastomer foam having a high expansion ratio can be produced according to the process for producing the polyester elastomer foam, and therefore, a thick polyester elastomer foam can be obtained. For example, when the polyester elastomer foam is produced by the continuous system, it is necessary to regulate the gap in the die at the tip of the extruder so as to be as narrow as possible (generally 0.1 to 1.0 mm) for maintaining the pressure in the extruder in the kneading/impregnation step. This means that for obtaining a thick polyester elastomer foam, the polyester elastomer composition which has been extruded through such narrow gap should be foamed at a high expansion ratio. In the known techniques in use, however, a high expansion ratio is not obtained and the resulting foam has been limited to thin one (for example, one having a thickness of 0.5 to 2.0 mm). In contrast, the process for producing the polyester elastomer foam using a high-pressure gas (particularly inert gas) can continuously produce a polyester elastomer foam having a final thickness of 0.50 to 5.00 mm.

The shape of the polyester elastomer foam of the present invention is preferably a sheet form or tape form, but is not particularly limited thereto.

The thickness of the polyester elastomer foam of the present invention is preferably 0.50 to 3.00 mm, more preferably 1.00 to 2.80 mm, further preferably 1.50 to 2.60 mm, but is not particularly limited thereto.

The density (apparent density) of the polyester elastomer foam of the present invention is preferably 0.01 to 0.20 $g/cm^3$, more preferably 0.03 to 0.15 $g/cm^3$, in terms of obtaining a polyester elastomer foam having the thickness as described above, but is not particularly limited thereto. If the density of the polyester elastomer foam exceeds 0.20 $g/cm^3$, foaming may be insufficient, and on the other hand, if the density is less than 0.01 $g/cm^3$, the strength of the polyester elastomer foam may be significantly reduced. Therefore, these density ranges are not preferred. That is, when the polyester elastomer foam of the present invention has a density of 0.01 to 0.20 $g/cm^3$, it will have satisfactory foaming characteristics (high expansion ratio), have proper strength and flexibility, and exhibit excellent cushioning properties.

Note that the apparent density of the polyester elastomer foam is calculated as follows. The polyester elastomer foam is punched into a test piece having a size of 50 mm×50 mm. The dimension of the test piece is measured with a vernier caliper to determine the volume of the test piece. Next, the weight of the test piece is measured with an electronic balance. Then, the apparent density was calculated by the following formula.

Apparent density $(g/cm^3)$=(mass weight of test piece)/(volume of test piece)

The relative density (density after foaming/density in unfoamed state) of the polyester elastomer foam of the present invention is preferably 0.01 to 0.2, more preferably 0.02 to 0.15, in terms of obtaining a thick polyester elastomer foam, but is not particularly limited thereto. If the relative density exceeds 0.2, foaming will be insufficient, which may produce reduction in flexibility and cushioning properties. Further, if the relative density is less than 0.01, the strength of the polyester elastomer foam may be significantly reduced, which is not preferred.

The polyester elastomer foam of the present invention preferably has a closed cell structure or semi-open/semi-closed cell structure as a cell structure, but is not particularly limited thereto. The semi-open/semi-closed cell structure is a cell structure containing both a closed cell moiety and an open cell moiety, and the ratio between the closed cell moiety and open cell moiety is not particularly limited. The polyester elastomer foam more preferably has a cell structure in which a closed cell moiety occupies 40% or less (especially 30% or less) of the polyester elastomer foam.

The average cell diameter of the polyester elastomer foam of the present invention is preferably 10 to 200 µm, more preferably 15 to 150 µm, further preferably 20 to 100 µm, but is not particularly limited thereto. If the average cell diameter exceeds 200 µm, there will be a risk of adversely affecting dustproofness, soundproofing properties, light blocking effect, and the like. On the other hand, if the average cell diameter is less than 10 µm, there will be a risk of adversely affecting flexibility.

Further, the proportion of cells having a cell diameter of 50 to 150 µm in the polyester elastomer foam of the present invention is preferably 40% or more, more preferably 50% or more, further preferably 60% or more, relative to all the cells. If the proportion of cells is less than 40%, the cell structure will tend to be nonuniform. Note that if the cell structure of a foam is nonuniform, many coarse cells (for example, cells having a cell diameter of 250 µm or more) will be present as a result of the nonuniformity, and the problem of the reduction in the dustproofness due to dust entering from the coarse cells will tend to occur. Further, if the cell structure of a foam is nonuniform, the problem of the deterioration of strain recovery of a foam and the reduction in the strength of a foam will tend to occur.

The cell diameter of the cells of the polyester elastomer foam of the present invention can be determined by capturing an enlarged image of a cut surface with a digital microscope, determining the area of a cell, and converting it to the equivalent circle diameter.

The repulsive force of the polyester elastomer foam of the present invention at 50% compression is preferably 0.1 to 4.0

N/cm², more preferably 0.5 to 3.5 N/cm², but is not particularly limited thereto. If the repulsive force at 50% compression is less than 0.1 N/cm², the strain recovery of the foam may be adversely affected. Note that if the strain recovery is low, the dustproofness will be adversely affected. On the other hand, if the repulsive force at 50% compression exceeds 5.0 N/cm², satisfactory flexibility may be unable to be exhibited. In addition, such a repulsive force may reduce step followability, resulting in deterioration of dustproofness. Note that the repulsive force at 50% compression is defined as a repulsive load when the polyester elastomer foam is compressed in a thickness direction so that it has a thickness of 50% of the initial thickness in an atmosphere of 23° C. Note that in the present application, when simply described as "repulsive force at 50% compression", the repulsive force at 50% compression by this definition is meant.

The compression set (after being maintained in a 50% compression state for 24 hours) of the polyester elastomer foam of the present invention is not particularly limited, but when the value of the compression set of the foam is decreased, the foam will have excellent shape retention, and therefore, the foam will have a cell structure resistant to deformation and shrinkage. Accordingly, when the value of the compression set of the polyester elastomer foam is decreased, the processability and strength of the polyester elastomer can be improved. Note that as used in the present application, the compression set means the strain which remains semipermanently after completely removing the compression stress which provides a predetermined thickness relative to the initial thickness. Note that a "50% compression state" refers to a "state compressed to a thickness of 50% of the initial thickness".

In particular, the polyester elastomer foam of the present invention preferably has a compression set at 80° C. (after being maintained in a 50% compression state for 24 hours in a temperature atmosphere of 80° C.) of 60% or less (for example, 0.1 to 60%), more preferably 55% or less (for example, 0.1 to 55%). If the compression set at 80° C. exceeds 60%, use of the foam, for example, in a high-temperature environment may result in reduction in characteristics such as strength, dustproofness, water resistance, soundproofing properties, processability, and anchoring properties with a double-sided tape.

The compression set is determined by the following formula.

Compression set (%)=$\{(a-c)/(a-b)\} \times 100$ a: Initial thickness of the foam
b: Thickness of the foam in a 50% compression state
c: Thickness of the foam after it is maintained in a 50% compression state for 24 hours at a predetermined temperature and then released from the compression state The compression set at 80° C. of the polyester elastomer foam can be obtained by forming and maintaining a highly expanded and micro cell structure by having a crosslinking structure in the foam with the above epoxy-modified polymer.

The thickness (final thickness) of the polyester elastomer foam, density (apparent density) of the polyester elastomer foam, relative density, and compression set as described above can be controlled by suitably selecting and setting, for example, operating conditions such as temperature, pressure, and time in the gas impregnation step or kneading/impregnation step, operating conditions such as a decompression rate, temperature, and pressure in the decompression step or molding/decompression step, heating temperature in the heating step after decompression or molding/decompression, and the like, depending on the gas (particularly inert gas) to be used and the composition of the polyester elastomer in the polyester elastomer composition.

Since the polyester elastomer of the present invention is formed of the polyester elastomer composition containing the epoxy-modified polymer as described above, it has a micro cell structure and is excellent in compression set characteristics. Since the polyester elastomer of the present invention is excellent in compression set characteristics, it has excellent dustproofness. Particularly, the polyester elastomer of the present invention is excellent in compression set characteristics at high temperatures (for example, 40 to 80° C.).

Further, since the polyester elastomer foam of the present invention has a micro cell structure and is excellent in compression set characteristics, it has excellent cushioning properties and excellent processability, particularly narrow width and thin layer processability at the time of punching. Therefore, the polyester elastomer foam of the present invention can be easily subjected to punching (particularly narrow width and thin layer punching). Thus, when the polyester elastomer foam is processed, it will not give defective processed goods which do not have a required thickness or shape, and the required thickness and shape can be maintained in the processed polyester elastomer foam.

Furthermore, since the polyester elastomer foam of the present invention is formed of a polyester elastomer composition containing the epoxy-modified polymer of the present invention, the problem of reduction in permanent set characteristics and the problem of reduction in product characteristics such as dustproofness due to the presence of coarse cells will not occur even if the foam is blackened by the addition of a colorant.

Since the polyester elastomer foam of the present invention has the above characteristics, it is suitably used as a sealing material for electric appliances, electronic appliances, or the like.

(Foam Material)

The foam material of the present invention is a material containing the polyester elastomer foam as described above. The shape of the foam material is preferably a sheet form (including a film form) and a tape form, but is not particularly limited thereto. Further, the foam material may have a structure consisting only of the polyester elastomer foam, or may have a structure in which the polyester elastomer foam is laminated with other layers (particularly, a pressure-sensitive adhesive layer (adhesive layer), a base material layer, and the like).

In particular, the foam material preferably has a pressure-sensitive adhesive layer. For example, when the foam material is a foam material in a sheet form, it may have a pressure-sensitive adhesive layer on one side or both sides thereof. When the foam material has a pressure-sensitive adhesive layer, a mount for processing can be provided on the foam material through the pressure-sensitive adhesive layer, and the foam material can also be fixed or tentatively fixed to an adherend.

Examples of the pressure-sensitive adhesives for forming the pressure-sensitive adhesive layer include, but are not limited to, acrylic pressure-sensitive adhesives, rubber pressure-sensitive adhesives (such as natural rubber pressure-sensitive adhesives and synthetic rubber pressure-sensitive adhesives), silicone pressure-sensitive adhesives, polyester pressure-sensitive adhesives, urethane pressure-sensitive adhesives, polyamide pressure-sensitive adhesives, epoxy pressure-sensitive adhesives, vinyl alkyl ether pressure-sensitive adhesives, and fluorine pressure-sensitive adhesives. Note that the pressure-sensitive adhesives may be used alone or in combination. Note that the pressure-sensitive adhesives may be pressure-sensitive adhesives of any form including emulsion pressure-sensitive adhesives, solvent pressure-sensitive adhesives, hot melt type adhesives, oligomer pressure-sensitive adhesives, and solid pressure-sensitive adhesives. Especially, acrylic pressure-sensitive adhesives are preferred as pressure-sensitive adhesives from the point of view of the pollution control to adherends and the like. That is, the foam material preferably has an acrylic pressure-sensitive adhesive layer on the polyester elastomer foam.

The thickness of the pressure-sensitive adhesive layer is preferably 2 to 100 μm, more preferably 10 to 100 μm, but is not particularly limited thereto. The pressure-sensitive adhesive layer is preferably as thin as possible because a thinner layer has a higher effect of preventing adhesion of soil and dust at an end. Note that the pressure-sensitive adhesive layer may have any form of a single layer and a laminate.

In the foam material, the pressure-sensitive adhesive layer may be provided through other layers (lower layers). Examples of such lower layers include other pressure-sensitive adhesive layers, an intermediate layer, an undercoat layer, and a base material layer (particularly a film layer, a nonwoven fabric layer, and the like). Further, the pressure-sensitive adhesive layer may be protected by a release film (separator) (such as a releasing paper and a release film).

Since the foam material contains the polyester elastomer foam, it has good dustproofness and has flexibility that can follow fine clearance. Further, it is excellent in compression set characteristics. In addition, it is excellent in processability.

The foam material may be processed so as to have desired shape, thickness, and the like. For example, it may be processed to various shapes according to the apparatus, equipment, housing, member, and the like in which it is used.

Since the foam material has the characteristics as described above, it is suitably used as a material used for attaching (mounting) various members or parts to a predetermined site. In particular, the foam material is suitably used as a material used for attaching (mounting) parts constituting electric or electronic appliances to a predetermined site.

That is, the foam material is suitably used for electric or electronic appliances. That is, the foam material may be a foam material for electric or electronic appliances.

Examples of the various members or parts which can be attached (mounted) utilizing the foam material preferably include, but are not particularly limited to, various members or parts in electric or electronic appliances. Examples of such members or parts for electric or electronic appliances include optical members or optical components such as image display members (displays) (particularly small-sized image display members) which are mounted on image display devices such as liquid crystal displays, electroluminescence displays, and plasma displays, and cameras and lenses (particularly small-sized cameras and lenses) which are mounted on mobile communication devices such as so-called "cellular phones" and "personal digital assistants".

Examples of suitable specific use modes of the foam material of the present invention include using it around a display such as LCD (liquid crystal display) and using by inserting it between a display such as LCD (liquid crystal display) and a housing (window part) for the purpose of dustproofing, shading, cushioning, or the like.

EXAMPLES

Hereinafter, the present invention will be more specifically described with reference to examples and comparative examples. It should be noted, however, that these are never construed to limit the scope of the present invention.

Example 1

In a twin-screw kneader were kneaded, at a temperature of 220° C., 100 parts by weight of a block copolymer of polybutylene terephthalate as a hard segment and polyether as a soft segment (trade name "Hytrel 5577" supplied by Du Pont-Toray Co., Ltd., melt flow rate at 230° C.: 1.8 g/10 min, melting point: 208° C.), 5 parts by weight of an acrylic lubricant (trade name "Metablen L-1000" supplied by Mitsubishi Rayon Co., Ltd.), 1 part by weight of hard clay surface-treated with a silane coupling agent (trade name "ST-301" supplied by Shiraishi Calcium Kaisha, Ltd.), 5 parts by weight of carbon black (trade name "Asahi #35" supplied by Asahi Carbon Co., Ltd.), and 2 parts by weight of an epoxy modifier (epoxy-modified acrylic polymer, weight average molecular weight (Mw): 50000, epoxy equivalent: 1200 g/eq, viscosity: 2850 mPa·s). The kneaded mixture was extruded into strands, cooled with water, and formed into pellets by cutting. The pellets were charged into a single-screw extruder, and carbon dioxide gas was injected at an atmospheric temperature of 240° C. and at a pressure of 17 MPa, where the pressure became 13 MP after injection. The pellets were sufficiently saturated with the carbon dioxide gas, cooled to a temperature suitable for foaming, and extruded through a die, yielding a polyester elastomer foam in a sheet form having a thickness of 2.0 mm.

Note that the mixed amount of the carbon dioxide gas was 3.2% by weight relative to the total amount of the pellets (100% by weight).

Example 2

In a twin-screw kneader were kneaded, at a temperature of 220° C., 100 parts by weight of a block copolymer of polybutylene terephthalate as a hard segment and polyether as a soft segment (trade name "Hytrel 5577" supplied by Du Pont-Toray Co., Ltd., melt flow rate at 230° C.: 1.8 g/10 min, melting point: 208° C.), 5 parts by weight of an acrylic lubricant (trade name "Metablen L-1000" supplied by Mitsubishi Rayon Co., Ltd.), 5 parts by weight of hard clay surface-treated with a silane coupling agent (trade name "ST-301" supplied by Shiraishi Calcium Kaisha, Ltd.), 5 parts by weight of carbon black (trade name "Asahi 435" supplied by Asahi Carbon Co., Ltd.), and 3 parts by weight of an epoxy modifier (epoxy-modified acrylic polymer, weight average molecular weight (Mw): 50000, epoxy equivalent: 1200 g/eq, viscosity: 2850 mPa·s). The kneaded mixture was extruded into strands, cooled with water, and formed into pellets by cutting. The pellets were charged into a single-screw extruder, and carbon dioxide gas was injected at an atmospheric temperature of 240° C. and at a pressure of 17 MPa, where the pressure became 13 MPa after injection. The pellets were sufficiently saturated with the carbon dioxide gas, cooled to a temperature suitable for foaming, and extruded through a die, yielding a polyester elastomer foam in a sheet form having a thickness of 1.7 mm.

Note that the mixed amount of the carbon dioxide gas was 3.1% by weight relative to the total amount of the pellets (100% by weight).

Example 3

Pellets were produced in the same manner as in Example 1. Next, a polyester elastomer foam in a sheet form having a thickness of 1.7 mm was obtained in the same manner as in Example 1.

Note that the mixed amount of the carbon dioxide gas was 3.5% by weight relative to the total amount of the pellets (100% by weight).

Example 4

Pellets were produced in the same manner as in Example 1. Next, a polyester elastomer foam in a sheet form having a thickness of 2.1 mm was obtained in the same manner as in Example 1.

Note that the mixed amount of the carbon dioxide gas was 3.0% by weight relative to the total amount of the pellets (100% by weight).

Comparative Example 1

Into a single-screw extruder were charged 45 parts by weight of polypropylene (melt flow rate (MFR): 0.35 g/10 min), 55 parts by weight of a polyolefin elastomer (melt flow rate (MFR): 6 g/10 min, JIS A hardness: 79°), 10 parts by weight of magnesium hydroxide, 10 parts by weight of a carbon product (trade name "Asahi #35" supplied by Asahi Carbon Co., Ltd.), and 1 part by weight of stearic acid monoglyceride. Carbon dioxide gas was injected at an atmospheric temperature of 220° C. and at a pressure of 13 MPa, where the pressure became 12 MPa after injection. The pellets were sufficiently saturated with the carbon dioxide gas, cooled to a temperature suitable for foaming, and extruded through a die, yielding a polyolefin elastomer foam in a sheet form having a thickness of 2.2 mm.

Note that the mixed amount of the carbon dioxide gas was 5.0% by weight relative to the total amount of the pellets (100% by weight).

Comparative Example 2

In a twin-screw kneader were kneaded, at a temperature of 220° C., 100 parts by weight of a block copolymer of polybutylene terephthalate as a hard segment and polyether as a soft segment (trade name "Hytrel 5577" supplied by Du Pont-Toray Co., Ltd., melt flow rate at 230° C.: 1.8 g/10 min, melting point: 208° C.), 5 parts by weight of an acrylic lubricant (trade name "Metablen L-1000" supplied by Mitsubishi Rayon Co., Ltd.), 1 part by weight of polypropylene (melt flow rate at 230° C.: 0.35 g/10 min), 5 parts by weight of carbon black (trade name "Asahi #35" supplied by Asahi Carbon Co., Ltd.), and 0.5 part by weight of an epoxy crosslinking agent (trifunctional epoxy compound, trade name "TEPIC-G" supplied by Nissan Chemical Industries, Ltd., melting point: 90 to 125° C., epoxy equivalent: 110 g/eq, viscosity: 100 cp or less, molecular weight 297). The kneaded mixture was extruded into strands, cooled with water, and formed into pellets by cutting. The pellets were charged into a single-screw extruder, and carbon dioxide gas was injected at an atmospheric temperature of 240° C. and at a pressure of 17 MPa, where the pressure became 13 MPa after injection. The pellets were sufficiently saturated with the carbon dioxide gas, cooled to a temperature suitable for foaming, and extruded through a die, yielding a polyester elastomer foam in a sheet form having a thickness of 2.2 mm.

Note that the mixed amount of the carbon dioxide gas was 3.0% by weight relative to the total amount of the pellets (100% by weight).

Comparative Example 3

In a twin-screw kneader were kneaded, at a temperature of 220° C., 100 parts by weight of a block copolymer of polybutylene terephthalate as a hard segment and polyether as a soft segment (trade name "Hytrel 5577" supplied by Du Pont-Toray Co., Ltd., melt flow rate at 230° C.: 1.8 g/10 min, melting point: 208° C.), 5 parts by weight of an acrylic lubricant (trade name "Metablen L-1000" supplied by Mitsubishi Rayon Co., Ltd.), 1 part by weight of hard clay surface-treated with a silane coupling agent (trade name "ST-301" supplied by Shiraishi Calcium Kaisha, Ltd.), 5 parts by weight of carbon black (trade name "Asahi #35" supplied by Asahi Carbon Co., Ltd.), and 4 parts by weight of a carbodiimide crosslinking agent (trade name "LA-1" supplied by Nisshinbo Chemical Inc.). The kneaded mixture was extruded into strands, cooled with water, and formed into pellets by cutting. The pellets were charged into a single-screw extruder, and carbon dioxide gas was injected at an atmospheric temperature of 240° C. and at a pressure of 17 MPa, where the pressure became 13 MPa after injection. The pellets were sufficiently saturated with the carbon dioxide gas, cooled to a temperature suitable for foaming, and extruded through a die, yielding a polyester elastomer foam in a sheet form having a thickness of 0.6 mm. This polyester elastomer foam showed insufficient foaming.

Note that the mixed amount of the carbon dioxide gas was 3.0% by weight relative to the total amount of the pellets (100% by weight).

(Evaluations)

The foams or pellets from examples and comparative examples were subjected to the following measurements or evaluations. The results are shown in Table 1. Note that since the polyester elastomer foam in comparative example 3 showed insufficient foaming and was thin, the repulsive force at 50% compression and compression set to be described below were not determined.

(Apparent Density)

A foam was punched with a punch die having a size of 50 mm×50 mm to prepare a test piece in a sheet form. The dimension of this test piece was measured with a vernier caliper. The volume of the test piece was calculated from these values. Next, the weight of the test piece was measured with an electronic balance. From the volume of the test piece and the weight of the test piece, the apparent density (g/cm$^3$) of the foam was calculated by the following formula.

Apparent density of foam (g/cm$^3$)=(weight of test piece)/(volume of test piece)

(Repulsive Force at 50% Compression (Repulsive Load at 50% Compression, 50% Compression Load))

The repulsive force at 50% compression was measured according to the method for measuring a compressive hardness prescribed in JIS K 6767.

The foam was cut into a test piece in a sheet form having a size of 30 mm in width×30 mm in length. Next, the test piece was compressed in the thickness direction at a rate of compression of 10 mm/min until the test piece was compressed to a compression ratio of 50%, wherein the resulting stress (N) was converted into a value per unit area (1 cm$^2$) to obtain a repulsive force (N/cm$^2$).

(Average Cell Diameter)

The average cell diameter (μm) of a sample foam was determined by capturing an enlarged image of a cellular portion of the foam using a digital microscope (trade name "VHX-500" supplied by Keyence Corporation) and analyzing the captured image through an analysis software of this measuring instrument. Note that the number of the cells in the captured enlarged image is about 100 pieces. Note that the cell diameter was obtained by determining the area of a cell and converting it to the equivalent circle diameter.

(Compression Set)

The compression set was determined by maintaining a 50% compression state for 24 hours under conditions of a humidity of 50% and a predetermined temperature and then releasing the compression state.

The compression set determined at a temperature of room temperature (23±2° C.) is shown in the column of "Compression set at room temperature" in Table 1; the compression set determined at a temperature of 50° C. is shown in the column of "Compression set at 50° C." in Table 1; and the compression set determined at a temperature of 80° C. is shown in the column of "Compression set at 80° C." in Table 1.

The compression set of a foam was determined as follows. The foam was cut into a square with an edge length of 30 mm, thus obtaining a test piece in a sheet form (test piece in a sheet form of 30 mm in width×30 mm in length). The thickness of this test piece was measured accurately, and it was referred to as thickness a. When the thickness of a test piece is less than 5 mm, the test piece is stacked for use.

Next, this test piece was compressed with a jig using two compression plates (aluminum plates) in the thickness direction from both sides of the test piece so that it has a thickness of 50% of the initial thickness, and while maintaining this compression state, the test piece was stored for 24 hours under a condition of a humidity of 50% and a predetermined temperature (room temperature, 50° C., or 80° C.). The thickness of the test piece in this compressed state was referred to as thickness b.

After the lapse of 24 hours, the test piece was released from the compression state and allowed to stand for 24 hours. After allowing to stand, the thickness of the test piece was accurately measured, and it was referred to as thickness c.

The compression set (%) at each temperature was calculated by the following formula using the thickness a, thickness b, and thickness c.

Note that the thickness a, thickness b, and thickness c were each measured in an environment of a temperature of 23±2° C. and a relative humidity of 50±5%.

Compression set (%)={(a−c)/(a−b)}×100

(Melt Tension)

Capilary Extrusion Rheometer supplied by ROSAND Co., Ltd. was used for measurement of melt tension, and the tension at a take-over speed of 3.0 m/min was referred to as melt tension. Note that pellets before foam molding were used for measurement. In addition, the temperature at the measurement was 220° C.

(Degree of Strain Hardening)

Pellets before foam molding were used for measurement. The pellets were formed into a sheet form having a thickness of 1 mm using a heated hot plate press, obtaining a sheet. A sample (10 mm in length, 20 mm in width, 1 mm in thickness) was cut from the sheet.

Using the sample, the uniaxial elongational viscosity at a temperature of 218° C. and a strain rate of 0.1 [1/s] was measured using a uniaxial elongational viscometer (supplied by TA Instruments Corp.).

Then, the degree of strain hardening was determined by the following formula.

Degree of strain hardening=log ηmax/log η0.2

(ηmax shows the highest elongational viscosity in the measurement of the uniaxial elongational viscosity, and η0.2 shows the elongational viscosity at a strain ε of 0.2.)

TABLE 1

|  | Example 1 | Example 2 | Example 3 | Example 4 | Comparative Example 1 | Comparative Example 2 | Comparative Example 3 |
|---|---|---|---|---|---|---|---|
| Apparent density (g/cm³) | 0.070 | 0.080 | 0.120 | 0.070 | 0.040 | 0.082 | 0.300 |
| Compression set (%) Room temperature | 8 | 6 | 6 | 5 | 3 | 20 | — |
| 50° C. | 36 | 33 | 32 | 31 | 96 | 58 | — |
| 80° C. | 52 | 49 | 50 | 49 | 96 | 84 | — |
| Repulsive force at 50% compression (N/cm²) | 1.5 | 1.2 | 2.4 | 1.8 | 1.2 | 2.7 | — |
| Average cell diameter (μm) | 80 | 90 | 60 | 140 | 80 | 150 | — |
| Color | Black | Black | Black | Black | Black | Black | Black |
| Base resin | Polyester | Polyester | Polyester | Polyester | Polyolefin | Polyester | Polyester |
| Modifier | Epoxy-modified acrylic polymer | Epoxy-modified acrylic polymer | Epoxy-modified acrylic polymer | Epoxy-modified acrylic polymer | Not added | Epoxy resin | Carbodiimide |
| Melt tension (cN) | 18 | 23 | 25 | 24 | 40 | 16 | 21 |
| Degree of strain hardening (uniaxial elongational viscosity) (%) | 3.66 | 3.12 | 3.48 | 3.37 | 1.56 | 1.69 | 2.45 |

The invention claimed is:

1. A polyester elastomer foam comprising a polyester elastomer composition containing a polyester elastomer having a melting point of 180 to 240° C. and an epoxy-modified polymer, wherein the content of the epoxy-modified polymer in the polyester elastomer composition is 0.5 to 4.0 parts by weight relative to 100 parts by weight of the polyester elastomer, wherein the epoxy-modified polymer is at least one polymer selected from an epoxy-modified acrylic polymer and an epoxy-modified polyethylene, having a weight average molecular weight of 5,000 to 100,000 and an epoxy equivalent of 100 to 3000 g/eq, wherein the polyester elastomer foam has a cell structure having an average cell diameter of 60 to 140 μm.

2. The polyester elastomer foam according to claim 1, wherein the polyester elastomer foam has an apparent density of 0.01 to 0.20 g/cm$^3$, a repulsive force at 50% compression of 0.1 to 4.0 N/cm$^2$, and a compression set at 80° C. (after being maintained in a 50% compression state for 24 hours) of 60% or less.

3. The polyester elastomer foam according to claim 1, wherein the polyester elastomer foam is formed through the steps of impregnating the polyester elastomer composition with a high-pressure gas and then subjecting the impregnated polyester elastomer composition to decompression to allow the impregnated polyester elastomer composition to expand.

4. The polyester elastomer foam according to claim 3, wherein the gas is an inert gas.

5. The polyester elastomer foam according to claim 4, wherein the gas is carbon dioxide gas.

6. The polyester elastomer foam according to claim 3, wherein the gas is in a supercritical state.

7. A foam material comprising a polyester elastomer foam according to claim 1.

8. The foam material according to claim 7, wherein the foam material has a pressure-sensitive adhesive layer on the polyester elastomer foam.

9. The foam material according to claim 8, wherein the pressure-sensitive adhesive layer is an acrylic pressure-sensitive adhesive layer.

10. The polyester elastomer foam according to claim 1, wherein the content of the epoxy-modified polymer in the polyester elastomer composition is 0.5 to 3.0 parts by weight relative to 100 parts by weight of the polyester elastomer.

* * * * *